US006185309B1

(12) United States Patent
Attias

(10) Patent No.: US 6,185,309 B1
(45) Date of Patent: Feb. 6, 2001

(54) METHOD AND APPARATUS FOR BLIND SEPARATION OF MIXED AND CONVOLVED SOURCES

(75) Inventor: Hagai Attias, San Francisco, CA (US)

(73) Assignee: The Regents of the University of California, Oakland, CA (US)

(*) Notice: Under 35 U.S.C. 154(b), the term of this patent shall be extended for 0 days.

(21) Appl. No.: 08/893,536

(22) Filed: Jul. 11, 1997

(51) Int. Cl.[7] .......... H04B 15/00

(52) U.S. Cl. .......... 381/94.1; 381/66; 381/94.2; 381/71.1

(58) Field of Search .......... 381/66, 316, 317, 381/318, 71.1, 71.11, 71.12, 71.14, 94.1, 94.2, 94.3, 94.7, 94.9, FOR 12, 92; 708/322; 379/410, 411, 426

(56) References Cited

U.S. PATENT DOCUMENTS

| | | | | |
|---|---|---|---|---|
| 4,405,831 | | 9/1983 | Michelson . | |
| 4,630,246 | | 12/1986 | Fogler . | |
| 4,759,071 | | 7/1988 | Heide . | |
| 5,208,786 | | 5/1993 | Weinstein et al. . | |
| 5,216,640 | | 6/1993 | Donald et al. . | |
| 5,237,618 | * | 8/1993 | Bethel | 381/93 |
| 5,283,813 | | 2/1994 | Shalvi et al. . | |
| 5,293,425 | | 3/1994 | Oppenheim et al. . | |
| 5,383,164 | | 1/1995 | Sejnowski et al. . | |
| 5,539,832 | | 7/1996 | Weinstein et al. | 381/94.1 |
| 5,675,659 | * | 10/1997 | Torkkola | 381/71.11 |
| 5,694,474 | * | 12/1997 | Ngo et al. | 381/66 |
| 5,706,402 | * | 1/1998 | Bell | 395/23 |
| 5,768,392 | * | 6/1998 | Graupe | 381/94.3 |
| 5,825,671 | * | 10/1998 | Deville | 381/94.1 |
| 5,825,898 | * | 10/1998 | Marash | 381/94.1 |
| 5,909,646 | * | 6/1999 | Deville | 455/313 |

* cited by examiner

*Primary Examiner*—Forester W. Isen
*Assistant Examiner*—Xu Mei
(74) *Attorney, Agent, or Firm*—Townsend and Townsend and Crew LLP

(57) ABSTRACT

A method and apparatus for separating signals from instantaneous and convolutive mixtures of signals. A plurality of sensors or detectors detect signals generated by a plurality of signal generating sources. The detected signals are processed in time blocks to find a separating filter, which when applied to the detected signals produces output signals that are statistically independent.

41 Claims, 3 Drawing Sheets

METHOD AND APPARATUS FOR BLIND SEPARATION OF MIXED AND CONVOLVED SOURCES

This invention was made with Government support under Grant No. N00014-94-1-0547, awarded by the Office of Naval Research. The Government has certain rights in this invention.

BACKGROUND OF THE INVENTION

The present invention relates generally to separating individual source signals from a mixture of the source signals and more specifically to a method and apparatus for separating convolutive mixtures of source signals.

A classic problem in signal processing, best known as blind source separation, involves recovering individual source signals from a mixture of those individual signals. The separation is termed ‘blind’ because it must be achieved without any information about the sources, apart from their statistical independence. Given L independent signal sources (e.g., different speakers in a room) emitting signals that propagate in a medium, and L' sensors (e.g., microphones at several locations), each sensor will receive a mixture of the source signals. The task, therefore, is to recover the original source signals from the observed sensor signals. The human auditory system, for example, performs this task for L'=2. This case is often referred to as the ‘cocktail party’ effect; a person at a cocktail party must distinguish between the voice signals of two or more individuals speaking simultaneously.

In the simplest case of the blind source separation problem, there are as many sensors as signal sources (L=L') and the mixing process is instantaneous, i.e., involves no delays or frequency distortion. In this case, a separating transformation is sought that, when applied to the sensor signals, will produce a new set of signals which are the original source signals up to normalization and an order permutation, and thus statistically independent. In mathematical notation, the situation is represented by $$\hat{u}_i(t) = \sum_{j}^{L} g_{ij} v_j(t) \tag{1}$$

where g is the separating matrix to be found, v(t) are the sensor signals and u(t) are the new set of signals.

Significant progress has been made in the simple case where L=L' and the mixing is instantaneous. One such method, termed independent component analysis (ICA), imposes the independence of u(t) as a condition. That is, g should be chosen such that the resulting signals have vanishing equal-time cross-cumulants. Expressed in moments, this condition requires that $$\langle \hat{u}_i(t)^m \hat{u}_j(t)^n \rangle = \langle \hat{u}_i(t)^m \rangle \langle \hat{u}_j(t)^n \rangle$$

for i=j and any powers m, n; the average taken over time t. However, equal-time cumulant-based algorithms such as ICA fail to separate some instantaneous mixtures such as some mixtures of colored Gaussian signals, for instance.

The mixing in realistic situations is generally not instantaneous as in the above simplified case. Propagation delays cause a given source signal to reach different sensors at different times. Also, multi-path propagation due to reflection or medium properties creates multiple echoes, so that several delayed and attenuated versions of each signal arrive at each sensor. Further, the signals are distorted by the frequency response of the propagation medium and of the sensors. The resulting ‘convolutive’ mixtures cannot be separated by ICA methods.

Existing ICA algorithms can separate only instantaneous mixtures. These algorithms identify a separating transformation by requiring equal-time cross-cumulants up to arbitrarily high orders to vanish. It is the lack of use of non-equal-time information that prevents these algorithms from separating convolutive mixtures and even some instantaneous mixtures.

As can be seen from the above, there is need in the art for an efficient and effective learning algorithm for blind separation of convolutive, as well as instantaneous, mixtures of source signals.

SUMMARY OF THE INVENTION

In contrast to existing separation techniques, the present invention provides an efficient and effective signal separation technique that separates mixtures of delayed and filtered source signals as well as instantaneous mixtures of source signals inseparable by previous algorithms. The present invention further provides a technique that performs partial separation of source signals where there are more sources than sensors.

The present invention provides a novel unsupervised learning algorithm for blind separation of instantaneous mixtures as well as linear and non-linear convoluted mixtures, termed Dynamic Component Analysis (DCA). In contrast with the instantaneous case, convoluted mixtures require a separating transformation $g_{ij}(t)$ which is dynamic (time-dependent): because a sensor signal $v_i(t)$ at the present time t consists not only of the sources at time t but also at the preceding time block $t-T \leqq t' < t$ of length T, recovering the sources must, in turn, be done using both present and past sensor signals, $v_i(t' \leqq t)$. Hence:

$$\hat{u}_i(t) = \sum_{j=0}^{L} \int_0^\infty dt' g_{ij}(t') v_j(t-t') \tag{2}$$

The simple time dependence $g_{ij}(t) = g_{ij}\delta(t)$ reduces the convolutive to the instantaneous case. In general, the dynamic transformation $g_{ij}(t)$ has a non-trivial time dependence as it couples mixing with filtering. The new signals $u_i(t)$ are termed the dynamic components (DC) of the observed data; if the actual mixing process is indeed linear and square (i.e., where the number of sensors L' equals the number of signal sources L), the DCs correspond to the original sources.

To find the separating transformation $g_{ij}(t)$ of the DCA procedure, it first must be observed that the condition of vanishing equal time cross-cumulance described above is not sufficient to identify the separating transformation because this condition involves a single time point. However, the stronger condition of vanishing two-time cross-cumulants can be imposed by invoking statistical independence of the sources, i.e., $$\langle \hat{u}_i(t)^m \hat{u}_j(t+\tau)^n \rangle = \langle \hat{u}_i(t)^m \rangle \langle \hat{u}_j(t+\tau)^n \rangle,$$

for i≠j in any powers m, n at any time τ. This is because the amplitude of source i at time t is independent of the amplitude of source j≠i at any time t+τ. This condition requires processing the sensor signals in time blocks and thus facilitates the use of their temporal statistics to deduce the separating transformation, in addition to their intersensor statistics.

An effective way to impose the condition of vanishing two-time cross-cumulants is to use a latent variable model. The separation of convoluted mixtures can be formulated as an optimization problem: the observed sensor signals are fitted to a model of mixed independent sources, and a separating transformation is obtained from the optimal values of the model parameters. Specifically, a parametric model is constructed for the joint distribution of the sensor signals over N-point time blocks, $p_v[v_1(t_1), \ldots, v_1(t_N), \ldots, v_{L'}(t_1), \ldots, v_{L'}(t_N)]$. To define $p_v$, the sources are modeled as independent stochastic processes (rather than stochastic variables), and a parameterized model is used for the mixing process which allows for delays, multiple echoes and linear filtering. The parameters are then optimized iteratively to minimize the information-theory distance (i.e., the Kullback-Leibler distance) between the model sensor distribution and the observed distribution. The optimized parameter values provide an estimate of the mixing process, from which the separating transformation $g_{ij}(t)$ is readily available as its inverse.

Rather than work in the time domain, it is technically convenient to work in the frequency domain since the model source distribution factorizes there. Therefore, it is convenient to preprocess the signals using Fourier transform and to work with the Fourier components $V_i(w_k)$.

In the linear version of DCA, the only information about the sensor signals used by the estimation procedure is their cross-correlations $<v_i(t)v_j(t')>$ (or, equivalently, their cross-spectra $<V_i(w)V_j^*(w)>$). This provides a computational advantage, leading to simple learning rules and fast convergence. Another advantage of linear DCA is its ability to estimate the mixing process in some non-square cases with more sources than sensors (i.e., $L>L'$). However, the price paid for working with the linear version is the need to constrain separating filters by decreasing their temporal resolution, and consequently to use a higher sampling rate. This is avoided in the non-linear version of DCA.

In the non-linear version of DCA, unsupervised learning rules are derived that are non-linear in the signals and which exploit high-order temporal statistics to achieve separation. The derivation is based on a global optimization formulation of the convolutive mixing problem that guarantees the stability of the algorithm. Different rules are obtained from time- and frequency-domain optimization. The rules may be classified as either Hebb-like, where filter increments are determined by cross-correlating inputs with a non-linear function of the corresponding outputs, or lateral correlation-based, where the cross-correlation of different outputs with a non-linear function thereof determine the increments.

According to an aspect of the invention, a signal processing system is provided for separating signals from an instantaneous mixture of signals generated by first and second signal generating sources, the system comprising: a first detector, wherein the first detector detects first signals generated by the first source and second signals generated by the second source; a second detector, wherein the second detector detects the first and second signals; and a signal processor coupled to the first and second detectors for processing all of the signals detected by each of the first and second detectors to produce a separating filter for separating the first and second signals, wherein the processor produces the filter by processing the detected signals in time blocks.

According to another aspect of the invention, a method is provided for separating signals from an instantaneous mixture of signals generated by first and second signal generating sources, the method comprising the steps of: detecting, at a first detector, first signals generated by the first source and second signals generated by the second source; detecting, at a second detector, the first and second signals; and processing, in time blocks, all of the signals detected by each of the first and second detectors to produce a separating filter for separating the first and second signals.

According to yet another aspect of the invention, a signal processing system is provided for separating signals from a convolutive mixture of signals generated by first and second signal generating sources, the system comprising: a first detector, wherein the first detector detects a first mixture of signals, the first mixture including first signals generated by the first source, second signals generated by the second source and a first time-delayed version of each of the first and second signals; a second detector, wherein the second detector detects a second mixture of signals, the second mixture including the first and second signals and a second time-delayed version of each of the first and second signals; and a signal processor coupled to the first and second detectors for processing the first and second signal mixtures in time blocks to produce a separating filter for separating the first and second signals.

According to a further aspect of the invention, a method is provided for separating signals from a convolutive mixture of signals generated by first and second signal generating sources, the method comprising the steps of: detecting a first mixture of signals at a first detector, the first mixture including first signals generated by the first source, second signals generated by the second source and a first time-delayed version of each of the first and second signals; detecting a second mixture of signals at a second detector, the second mixture including the first and second signals and a second time-delayed version of each of the first and second signals; and processing the first and second mixtures in time blocks to produce a separating filter for separating the first and second signals.

According to yet a further aspect of the invention, a signal processing system is provided for separating signals from a mixture of signals generated by a plurality L of signal generating sources, the system comprising: a plurality L' of detectors for detecting signals $\{v_n\}$, wherein the detected signals $\{v_n\}$ are related to original source signals $\{u_n\}$ generated by the plurality of sources by a mixing transformation matrix A such that $v_n=Au_n$, and wherein the detected signals $\{v_n\}$ at all time points comprise an observed sensor distribution $p_v[v(t_1), \ldots, v(t_N)]$ over N-point time blocks $\{t_n\}$ with $n=0, \ldots, N-1$; and a signal processor coupled to the plurality of detectors for processing the detected signals $\{v_n\}$ to produce a filter G for reconstructing the original source signals $\{u_n\}$, wherein said processor produces the reconstruction filter G such that a distance function defining a difference between the observed distribution and a model sensor distribution $p_y[y(t_1), \ldots, y(t_N)]$ is minimized, the model sensor distribution parametrized by model source signals $\{x_n\}$ and a model mixing matrix H such that $y_n=Hx_n$, and wherein the reconstruction filter G is a function of H.

According to an additional aspect of the invention, a method is provided for constructing a separation filter G for separating signals from a mixture of signals generated by a first signal generating source and a second signal generating source, the method comprising the steps of: detecting signals $\{v_n\}$, the detected signals $\{v_n\}$ including first signals generated by the first source and second signals generated by the second source, the first and second signals each being detected by a first detector and a second detector, wherein the detected signals $\{v_n\}$ are related to original source signals $\{u_n\}$ by a mixing transformation matrix A such that $v_n=Au_n$, wherein the original signals $\{u_n\}$ are generated by the first and second sources, and wherein the detected signals $\{v_n\}$ at all time points comprise an observed sensor distribution $p_v[v(t_1), \ldots ,v(t_N)]$ over N-point time blocks $\{t_n\}$ with $n=0, \ldots ,N-1$; defining a model sensor distribution $p_y[y(t_1), \ldots ,y(t_N)]$ over N-point time blocks $\{t_n\}$ the model sensor distribution parametrized by model source signals $\{x_n\}$ and a model mixing matrix H such that $Y_n=Hx_n$; minimizing a distance function, the distance function defining a difference between the observed distribution and the model distribution; and constructing the separating filter G, wherein G is a function of H.

The invention will be further understood upon review of the following detailed description in conjunction with the drawings.

DESCRIPTION OF THE PREFERRED EMBODIMENT

Figure 1:
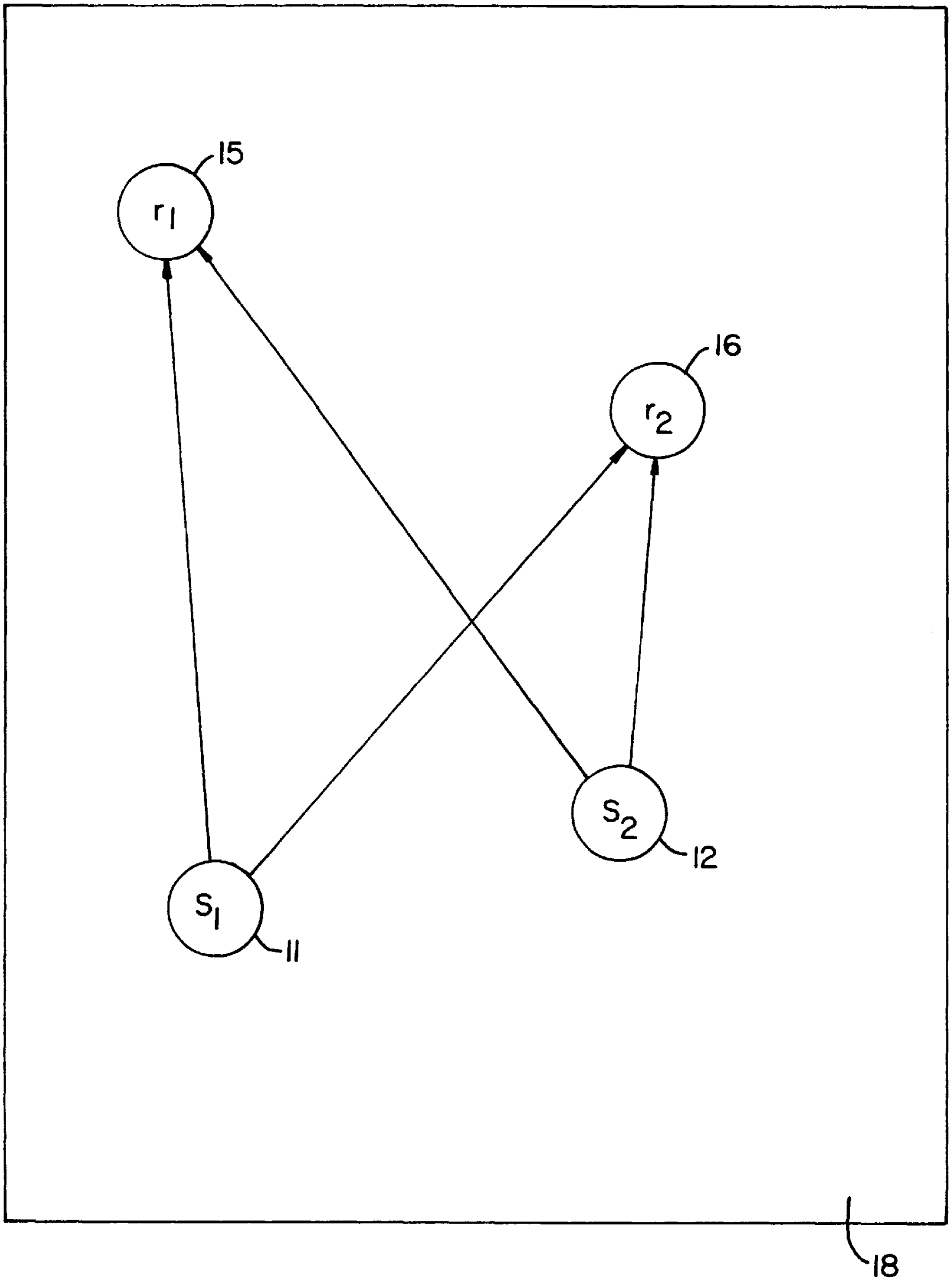
FIG. 1 illustrates an exemplary arrangement for the situation of instantaneous mixing of signals.

FIG. 1 illustrates an exemplary arrangement for the situation of instantaneous mixing of signals. Signal source 11 and signal source 12 each generate independent source signals. Sensor 15 and sensor 16 are each positioned in a different location. Sensor 15 and sensor 16 are any type of sensor, detector or receiver for receiving any type of signals, such as sound signals and electromagnetic signals, for example. Depending on the respective proximity of signal source 11 to sensor 15 and sensor 16, sensor 15 and sensor 16 each receive a different time-delayed version of signals generated by signal source 11. Similarly, for signal source 12, depending on the proximity to sensor 15 and sensor 16, sensor 15 and sensor 16 each receive a different time-delayed version of signals generated by signal source 12. Although realistic situations always include propagation delays, if the signal velocity is very large those delays are very small and can be neglected, resulting in an instantaneous mixing of signals. In one embodiment, signal source 11 and signal source 12 are two different human speakers in a room 18 and sensor 15 and sensor 16 are two different microphones located at different locations in room 18.

Figure 2:
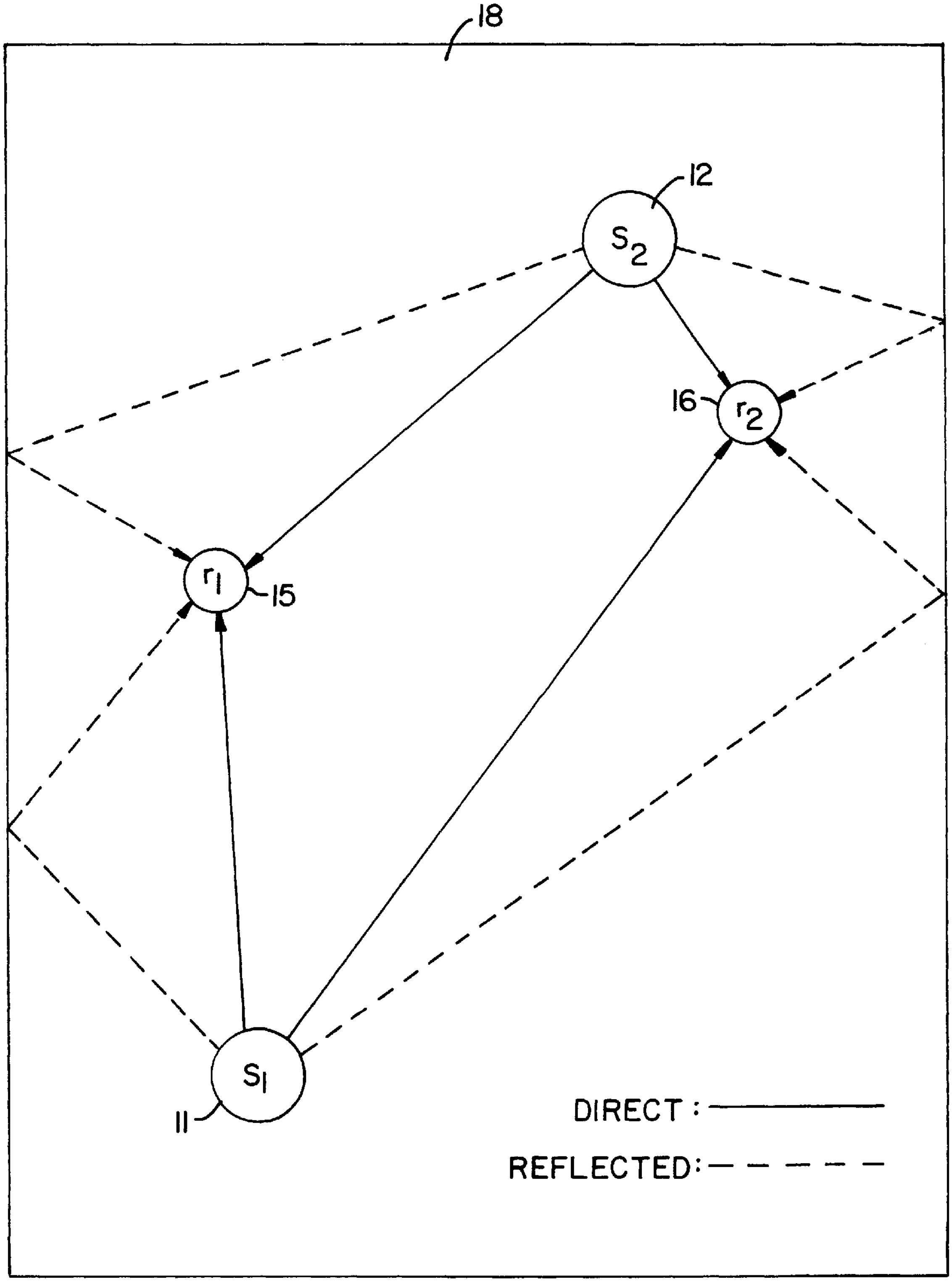
FIG. 2 illustrates an exemplary arrangement for the situation of convolutive mixing of signals.

FIG. 2 illustrates an exemplary arrangement for the situation of convolutive mixing of signals. As in FIG. 1, signal source 11 and signal source 12 each generate independent signals which are received at each of sensor 15 and sensor 16 at different times, depending on the respective proximity of signal source 11 and signal source 12 to sensor 15 and sensor 16. Unlike the instantaneous case, however, sensor 15 and sensor 16 also receive delayed and attenuated versions of each of the signals generated by signal source 11 and signal source 12. For example, sensor 15 receives multiple versions of signals generated by signal source 11. As in the instantaneous case, sensor 15 receives signals directly from signal source 11. In addition, sensor 15 receives the same signals from sensor 11 along a different path. For example, first signals generated by the first signal source travels directly to sensor 15 and is also reflected off the wall to sensor 15 as shown in FIG. 2. As the reflected signals follow a different and longer path than the direct signals, they are received by sensor 11 at a slightly later time than the direct signals. Additionally, depending on the medium through which the signals travel, the reflected signals may be more attenuated than the direct signals. Sensor 15 therefore receives multiple versions of the first generated signals with varying time delays and attenuation. In a similar fashion, sensor 16 receives multiple delayed and attenuated versions of signals generated by signal source 11. Finally, sensor 15 and sensor 16 each receive multiple time delayed and attenuated versions of signals generated by signal source 12.

Although only 2 sensors and 2 sources are shown in FIGS. 1 and 2, the invention is not limited to 2 sensors and 2 sources, and is applicable to any number of sources L and any number of sensors L'. In the preferred embodiment, the number of sources L equals the number of sensors L'. However, in another embodiment, the invention provides for separation of signals where the number of sensors L' is less than the number of sources L. The invention is also not limited to human speakers and sensors in a room. Applications for the invention include, but are not limited to, hearing aids, multisensor biomedical recordings (e.g., EEG, MEG and EKG) where sensor signals originate from many sources within organs such as the brain and the heart, for example, and radar and sonar (i.e., techniques using sound and electromagnetic waves).

Figure 3B:
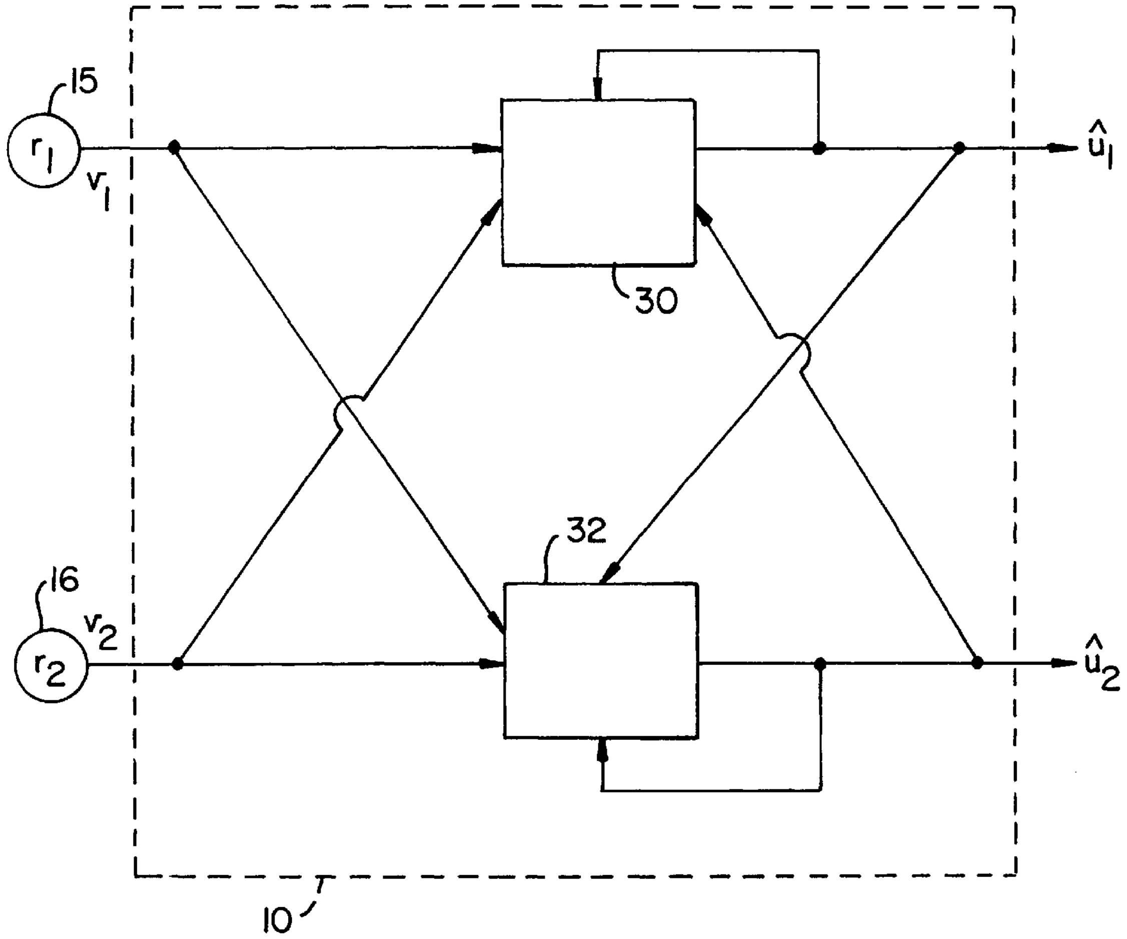
FIG. 3*b* illustrates a detailed functional diagram of the 2×2 network of FIG. 3*a*.
Figure 3A:
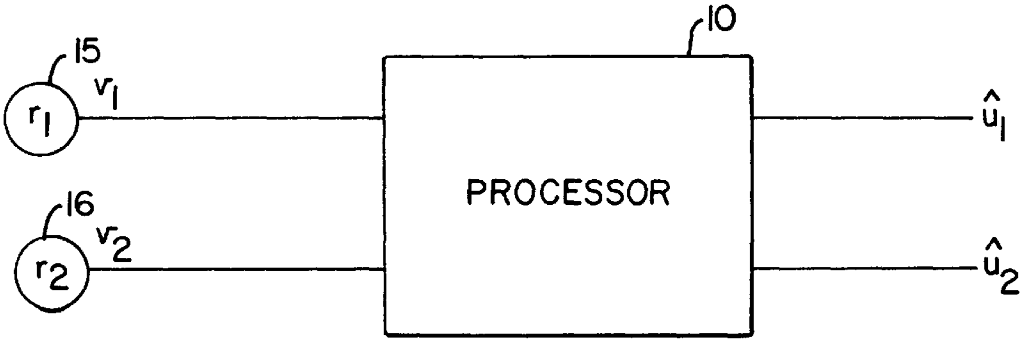
FIG. 3*a* illustrates a functional representation of a 2×2 network.

FIG. 3*a* illustrates a functional representation of a 2×2 network. FIG. 3*b* illustrates a detailed functional diagram of the 2×2 network of FIG. 3*a*. The 2×2 network (e.g., representative of the situation involving only 2 sources generating signals received by 2 sensors or detectors) includes processor 10, which can be used to solve the blind source separation problem given two physically independent signal sources, each generating signals observed by two independent signal sensors. The inputs of processor 10 are the observed sensor signals $v_n$ received at sensor 15 and sensor 16, for example. Processor 10 includes first signal processing unit 30 and second signal processing unit 32 (e.g., in an L×L situation, a processing unit for each of the L sources), each of which receives all observed sensor signals $v_n$ (as shown, only $v_1$ and $v_2$ for the 2×2 case) as input. Signal processors 30 and 32 each also receive as input, the output of the other processing units (processing units 30 and 32, as shown in the 2×2 situation). The signals are processed according to the details of the invention as described herein. The outputs of processor 10 are the estimated source signals, $\hat{u}_n$, which are equal to the original source signals, $u_n$, once the network converges on a solution to the blind source separation problem as will be described below in regard to the instantaneous and convolutive mixing cases.

Instantaneous Mixing

In one embodiment, discrete time units, $t=t_n$, are used. The original, unobserved source signals will be denoted by $u_i(t_n)$, where $i=1, \ldots ,L$, and the observed sensor signals are denoted by $v_i(t_n)$, where $i=1, \ldots ,L'$. The L'×L mixing matrix $A_{ij}$ relates the original source signals to the observed sensor signals by the equation $$v_i(t_n) = \sum_j A_{ij} u_j(t_n) \tag{3}$$

For simplicity's sake, the following notation is used: $u_{i,n}=u_i(t_n)$, $v_{in}=v_i(t_n)$. Additionally, vector notation is used, where $u_n$ denotes an L-dimensional source vector at time $t_n$ whose coordinates are $u_{i,n}$, and similarly where $v_n$ is an L'-dimensional vector, for example. Hence, $v_n=Au_n$. Finally, N-point time blocks $\{t_n\}$, where n=0, . . . N−1, are used to exploit temporal statistics.

The problem is to estimate the mixing matrix A from the observed sensor signals $v_n$. For this purpose, a latent-variable model is constructed with model sources $x_{i,n}=x_i(t_n)$, model sensors $y_{i,n}=y_i(t_n)$, and a model mixing matrix $H_{ij}$, satisfying $$y_n=Hx_n, \tag{4}$$

for all n. The general approach is to generate a model sensor distribution $p_y(\{y_n\})$ which best approximates the observed sensor distribution $p_v(\{v_n\})$. Note that these distributions represent all sensor signals at all time points, i.e., $$p_y(\{y_n\})=p_y(y_{1,1}, \ldots y_{1,N}, \ldots y_{L',1}, \ldots y_{L',N}).$$

This approach can be illustrated by the following:

$$u_n \rightarrow A \rightarrow v_n{:}p_v \sim p_y{:}y_n \rightarrow H \rightarrow x_n$$

The observed distribution $p_v$ is created by mixing the sources $u_n$ via the mixing matrix A, whereas the model distribution $p_y$ is generated by mixing the model sources $x_n$ via the model mixing matrix H.

The DC's obtained by $\hat{u}_n=H^{-1}v_n$ in the square case are the original sources up to normalization factors and an ordering permutation. The normalization ambiguity introduces a spurious continuous degree of freedom since renormalizing $x_{j,n}\rightarrow a_j x_{j,n}$ can be compensated for by $H_{ij}\rightarrow H_{ij}/aj_j$, leaving the sensor distribution unchanged. In one embodiment, the normalization is fixed by setting $H_{ii}=1$.

It is assumed that the sources are independent, stationary and zero-mean, thus $$<X_n>=0,\ <X_n X_{n+m}^T>=s_m, \tag{5}$$

where the average runs over time points n. $x_n$ is a column vector, $x_{n+m}^T$ is a row vector; due to statistical independence, their products $s_m$ are diagonal matrices which contain the auto-correlations of the sources, $s_{ij,m}=<x_{i,n}x_{i,n+m}>\delta_{ij}$. In one embodiment, the separation is performed using only second-order statistics, but higher order statistics may be used. Additionally, the sources are modelled as Gaussian stochastic processes parametrized by $s_m$.

In one embodiment, computation is done in the frequency domain where the source distribution readily factorizes. This is done by applying the discrete Fourier transform (DFT) to the equation $y_n=Hx_n$ to get $$y_k=HX_k \tag{6}$$

where the Fourier components $X_k$ corresponding to frequencies $\omega_k=2\pi k/N$, k=0, . . . ,N−1 are given by $$X_k=\sum_{n=0}^{N-1} e^{-i\omega_k n}x_n \tag{7}$$

and satisfy $X_{N-k}=X_k^*$; the same holds for $Y_k$; $V_k$. The DFT frequencies $\omega_k$ are related to the actual sound frequencies $f_k$ by $\omega_k=2\pi f_k/f_s$, where $f_s$ is the sampling frequency. The DFT of the sensor cross-correlations $<v_{i,n}v_{j,n+m}>$ and the source auto-correlations $<x_{i,n}x_{i,n+m}>$ are the sensor cross-spectra $C_{ij,k}=<V_{i,k}V_{j,k}^*>$ and the source power spectra $S_{ij,k}=<|X_{i,k}|^2>\delta_{ij}$. In matrix notation $$S_k=<X_k X_k^\dagger>,\ C_k=<V_k V_k^\dagger>. \tag{8}$$

Finally, the model sources, being Gaussian stochastic processes with power spectra $S_k$, have a factorial Gaussian distribution in the frequency domain: the real and imaginary parts of $X_{i,k}$ are distributed independently of each other and of $X_{i,k'\neq k}$ with variance $S_{ii,k}/2$, $$p_x(\{X_k\})=\prod_{i=1}^{L}\prod_{k=1}^{N/2-1}\frac{1}{\pi S_{ii,k}}e^{-\frac{|x_{i,k}|^2}{s_{ii,k}}}=\prod_{k=1}^{N/2-1}\frac{1}{det(\pi Sk)}e^{-X_k^\dagger S_k^{-1}X_k} \tag{9}$$

(N is assumed to be even only for concreteness).

To achieve $p_y\approx p_v$ the model parameters H and $S_k$ are adjusted to obtain agreement in the second-order statistics between model and data, $<Y_kY_k^\dagger>=<V_kV_k^\dagger>$, which, using equations (6) and (8) implies $$HS_kH^T=C_k \tag{10}$$

This is a large set of coupled quadratic equations. Rather than solving the equations directly, the task of finding H and $S_k$ is formulated as an optimization problem.

The Fourier components $X_0$, $X_{N/2}$ (which are real) have been omitted from equation (9) for notational simplicity. In fact, it can be shown by counting variables in equation (10), noting that $C_k^\dagger=C_k$, $S_k$ is diagonal and all three matrices are real, that H in the square case can be obtained as long as no less than two frequencies $\omega_k$ are used, thus solving the separation problem. However, these equations may be under-determined, e.g., when two sources i,j have the same spectrum $S_{ii,k}=S_{jj,k}$ for these $\omega_k$, as will be discussed below. It is therefore advantageous to use many frequencies.

In one embodiment, the number of sources L equals the number of sensors L'. In this case, since the model sources and sensors are related linearly by equation (6), the distribution $p_Y$ can be obtained directly from $p_x$ equation (9), and is given in a parametric form $p_y(\{Y_k\};H,\{S_k\})$. This is the joint distribution of the Fourier components of the model sensor signals and is Gaussian, but not factorial.

To measure its difference from the observed distribution $p_v(\{V_k\})$ in one embodiment we use the Kullback-Leibler (KL) distance $D(p_v, p_y)$, an asymmetric measure of the distance between the correct distribution and a trial distribution. One advantage of using this measure is that its minimization is equivalent to maximizing the log-likelihood of the data; another advantage is that it usually has few irrelevant local minima compared to other measures of distance between functions, e.g., the sum of squared differences. The KL distance is derived in more detail below when describing convolutive mixing. The KL distance is given in terms of the separating transformation G, which is the inverse mixing matrix $$G=H^{-1} \tag{11}$$

Using matrix notation, $$D(p_Y, p_V)=\frac{1}{N}\sum_{k=1}^{N/2-1}(-\log detG^TS_k^{-1}G+trG^TS_k^{-1}GC_k) \tag{12}$$

Note that $C_k$, $S_k$, G are all matrices ($S_k$ are diagonal) and have been defined in equations (8) and (11); the KL distance is given by determinants and traces of their products at each frequency. The cross-spectra $C_k$ are computed from the observed sensor signals, whereas G and $S_k$ are optimized to minimize $D(p_y, p_v)$.

In one embodiment, this minimization is done iteratively using the gradient descent method. To ensure positive definiteness of $S_k$, the diagonal elements (the only non-zero ones) are expressed as $S_{ii,k}=\epsilon^{q_{i,k}}$ and the log-spectra $q_{i,k}$ are used in their place. The rules for updating the model parameters at each iteration are obtained from the gradient of $D(p_y, p_v)$:

$$\delta H = -\epsilon\delta\frac{D}{\delta H} = -2\epsilon Re\frac{1}{N}\sum_{k=1}^{N/2-1} G^T(I - S_k^{-1}GC_kG^T), \tag{13a}$$

$$\delta q_{i,k} = -\epsilon\delta\frac{D}{\delta q_{i,k}} = -\epsilon\frac{1}{N}(I - S_k^{-1}GC_kG^T)_{ii}. \tag{13b}$$

These are the linear DCA learning rules for instantaneous mixing. The learning rate is set by $\epsilon$. These are off-line rules and require the computation of the sensor cross-spectra from the data prior to the optimization process. The corresponding on-line rules are obtained by replacing the average quantity $C_k$ by the measured $v_k v_k^\dagger$ in equation (13), and would perform stochastic gradient descent when applied to the actual sensor data.

The learning rules, equation (13) above, for the mixing matrix H involves matrix inversion at each iteration. This can be avoided if, rather than updating H, the separating transformation G is updated. The resulting less expensive rule is derived below when describing convolutive mixing.

The optimization formulation of the separation problem can now be related to the coupled quadratic equations. Rewriting them in terms of G gives $GC_kG^T=S_k$ for all k. The transformation G and spectra $S_k$ which solve these equations for the observed sensors' $C_k$ can then be seen from equation (13) to extremize the KL distance (minimization can be shown by examining the second derivatives). The spectra $S_k$ are diagonal whereas the cross-spectra $C_k$ are not, corresponding to uncorrelated source and correlated sensor signals, respectively. Therefore, the process that minimizes the KL distance through the rules, equation (13), decorrelates the sensor signals in the frequency domain by decorrelating all their Fourier components simultaneously producing separated signals with vanishing cross-correlations.

Convolutive Mixing

In realistic situations, the signal from a given source arrives at the different sensors at different times due to propagation delays as shown in FIG. 2, for example. Denoting by $d_{ij}$ the number of time points corresponding to the time required for propagation from source j to sensor i, the mixing model for this case is $$y_{i,n} = \sum_{j=1}^{L} H_{ij}x_{j,n-dij}. \tag{14}$$

The parameter set consisting of the spectra $S_k$ and mixing matrix H is now supplemented by the delay matrix d. This introduces an additional spurious degree of freedom (recall that in one embodiment the source normalization ambiguity above is eliminated by fixing $H_{ii}=1$), because the t=0 point of each source is arbitrary: a shift of source j by $m_j$ time points, $x_{j,n}\rightarrow x_{j,n-m_j}$; can be compensated for by a corresponding shift in the delay matrix, $d_{ij}\rightarrow d_{ij}+m_j$. This ambiguity arises from the fact that only the relative delays $d_{ij}-d_{lj}$ can be observed; absolute delays $d_{ij}$ cannot. This is eliminated, in one embodiment, by setting $d_{ii}=0$.

More generally, sensor i may receive several progressively delayed and attenuated versions of source j due to the multi-path signal propagation in a reflective environment, creating multiple echoes. Each version may also be distorted by the frequency response of the environment and the sensors. This situation can be modeled as a general convolutive mixing, meaning mixing coupled with filtering:

$$y_n = \sum_{m=0}^{M-1} h_m x_{n-m}. \tag{15}$$

The simple mixing matrix of the instantaneous case, equation (4), has become a matrix of filters $h_m$, termed the mixing filter matrix. It is composed of a series of mixing matrices, one for each time point m, whose ij elements $h_{ij,m}$ constitute the impulse response of the filter operating on the source signal j on its way to sensor i. The filter length M corresponds to the maximum number of detectable delayed versions. This is clearer when time and component notation are used explicitly:

$$y_i(t_n) = \sum_j\sum_m h_{ij}(t_n)x_j(t_n - t_m) = \sum_j h_{ij}(t_n) * x_j(t_n),$$

where * indicates linear convolution. This model reduces to the single delay case, equation (14), when $h_{ij,m}=H_{ij}\delta_{m,d_{ij}}$. The general case, however, includes spurious degrees of freedom in addition to absolute delays as will be discussed below.

Moving to the frequency domain and recalling that the m-point shift in $x_{j,n}$ multiplies its Fourier transform $X_{j,k}$ by a phase factor $e^{-\omega_k m}$, gives $$Y_k=H_kX_k, \tag{16}$$

where $H_k$ is the mixing filter matrix in the frequency domain.

$$H_k = \sum_{m=0}^{N-1} e^{-i\omega_k m}h_m, \tag{17}$$

whose elements $H_{ij,k}$ give the frequency response of the filter $h_{ij,m}$.

A technical advantage is gained, in one embodiment, by working with equation (16) in the frequency domain. Whereas convolutive mixing is more complicated in the time domain, equation (15), than instantaneous mixing, equation (4), since it couples the mixing at all time points, in the frequency domain it is almost as simple: the only difference between the instantaneous case, equation (6), and the convolutive case, equation (16) is that the mixing matrix becomes frequency dependent, $H\rightarrow H_k$, and complex, with $H_k=H_{N-k}^*$.

The KL distance between the convolutive model distribution $p_y(\{Y_k\}; \{h_m\}, \{S_k\})$, parametrized by the mixing filters and the source spectra, and the observed distribution $p_v$ will now be derived.

Starting from the model source distribution, equation (9), and focusing on general convolutive mixing, from which the derivation for instantaneous mixing follows as a special case. The linear relation $Y_k=H_kX_k$, equation (16), between source and sensor signals gives rise to the model sensor distribution $$p_y(\{Y_k\}) = \frac{p_x(\{X_k\})}{\Pi_k det H_k H_k^\dagger} \tag{18}$$

To derive equation (18) recall that the distribution $p_x$ of the complex quantity, $X_k$ (or $p_y$ of $Y_k$:) is defined as the joint distribution of its real and imaginary parts, which satisfy $$\begin{pmatrix} ReY_k \\ ImY_k \end{pmatrix} = \begin{pmatrix} ReH_k & -ImH_k \\ ImH_k & ReH_k \end{pmatrix}\begin{pmatrix} ReX_k \\ ImX_k \end{pmatrix} \tag{19}$$

The determinant of the 2L×2L matrix in equation (19) equals det $H_kH_k^\dagger$ used in equation (18).

The model source spectra $S_k$, and mixing filters $h_m$, (see equation (17)) are now optimized to make the model distribution $p_y$ as close as possible to the observed $p_v$. In one embodiment, this is done by minimizing the Kullback-Leibler (KL) distance $$\begin{aligned} D(p_v, p_Y) &= \int dV p_v(V)\log\frac{p_v(V)}{p_Y(V)} \\ &= -H_v - \langle \log p_Y(V)\rangle \end{aligned} \tag{20}$$

($V=\{V_k\}$). Since the observed sensor entropy $H_v$ is independent of the mixing model, minimizing $D(p_v,p_y)$ is equivalent to maximizing the log-likelihood of the data.

The calculation of $-\langle\log p_y(V)\rangle$ includes several steps. First, take the logarithm of equation (18) and write it in terms of the sensor signals $V_k$, substituting $Y_k=V_k$ and $X_k=G_kV_k$ where $G_k=H_k^{-1}$. Then convert it to component notation, use the cross-spectra, equation (8), to average over $V_k$, and convert back to matrix notation. Dropping terms independent of the parameters $S_k$ and $H_k$ gives:

$$D(p_v, p_Y) = \frac{1}{N}\sum_{k=1}^{N/2-1}\left(-\log det G_k^\dagger S_k^{-1} G_k + tr\, G_k^\dagger S_k^{-1} G_k C_k\right) \tag{21}$$

where $G_k=H_k^{-1}$. A gradient descent minimization of D is performed using the update rules:

$$\delta h_m = -\epsilon\frac{\partial D}{\partial h_m} = -2\epsilon Re\frac{1}{N}\sum_{k=1}^{N/2-1} e^{i\omega_k m} G_k^\dagger\left(I - S_k^{-1}G_kC_kG_k^\dagger\right), \tag{22a}$$

$$\delta q_{i,k} = -\epsilon\frac{\partial D}{\partial q_{i,k}} = -\epsilon\frac{1}{N}(I - S_k^{-1}G_kC_kG^\dagger)_{ii}. \tag{22b}$$

To derive the update rules, equations (22a and 22b), for example, differentiate D(pv,$p_y$) with respect to the filters $h_{ji,m}$ and the log-spectra $q_{i,k}$, using the chain rule as is well known.

As mentioned above, a less expensive learning rule for the instantaneous mixing case can be derived by updating the separating matrix G at each iteration, rather than updating H. For example, multiply the gradient of D by $G^TG$ to obtain $$\delta G = \epsilon\frac{\partial D}{\partial G}G^TG = \epsilon Re\sum_{k=1}^{N/2-1}(I - S_k^{-1}GC_kG^T)G. \tag{23}$$

Equations (22a) and (22b) are the DCA learning rules for separating convolutive mixtures. These rules, as well as the KL distance equation (21), reduce to their instantaneous mixing counterparts when the mixing filter length in equation (15) is M=1. The interpretation of the minimization process as performing decorrelation of the sensor signals in the frequency domain holds here as well.

Once the optimal mixing filters $h_m$ are obtained, the sources can be recovered by applying the separating transformation $$g_n = \frac{1}{N'}\sum_k e^{i\omega'_k n}G_k$$

to the sensors to get the new signals $\hat{u}_n=g_n*v_n$. The length of the separating filters $g_n$ is N', and the corresponding frequencies are $\omega'_k=2\pi k/N'$. N' is usually larger than the length M of the mixing filters and may also be larger than the time block N. This can be illustrated by a simple example. Consider the case L=L'=1 with $H_k=1\div ae^{-i\omega_k}$, which produces a single echo delayed by one time point and attenuated by a factor of a. The inverse filter is $$G_k = H_k^{-1} = \sum_{n=0}^{\infty}(-a)^n e^{-i\omega_k n}.$$

Stability requires $|a|<1$, thus the effective length N' of $g_n$ is finite but may be very large.

In the instantaneous case, the only consideration is the need for a sufficient number of frequencies to differentiate between the spectra of different sources. In one embodiment, the number of frequencies is as small as two. However, in the convolutive case, the transition from equation (15) to equation (16) is justified only if $N \gg M$ (unless the signals are periodic with period N or a divisor thereof, which is generally not the case). This can be understood by observing that when comparing two signals, one can be recognized as a delayed version of the other only if the two overlap substantially. The ratio M/N that provides a good approximation decreases as the number of sources and echoes increase. In practical applications M is usually unknown, hence several trials with different values of N are run before the appropriate N is found.

Non-Linear DCA

In many practical applications no information is available about the form of the mixing filters, and imposing the constraints required by linear DCA will amount to approximating those filters, which may result in incomplete separation. An additional, related limitation of the linear algorithm is its failure to separate sources that have identical spectra.

Two non-linear versions of DCA are now described, one in the frequency domain and the other in the time domain. As in the linear case, the derivation is based on a global optimization formulation of the convolutive separation problem, thus guaranteeing stability of the algorithm.

Optimization in the Frequency Domain

Let $u_n$ be the original (unobserved) source vector whose elements $u_{i,n}=u_i(t_n)$, i=1, . . . , L are the source activities at time $t_n$, and let $v_n$ be the observed sensor vector, obtained from $u_n$ via a convolutive mixing transformation $$a_n: v_{i,n} = \sum_j a_{ij,n} * u_{j,n},$$

where * denotes linear convolution. Processing is done in N-point time blocks $\{t_n\}$, n=0, . . . , N−1.

The convolutive mixing situation is modeled using a latent-variable approach. $x_n$ is the L-dimensional model source vector, $y_n$ is similarly the model sensor vector, and $h_n$, n=0, . . . , M−1 is the model mixing filter matrix with filter length M. The model mixing process or, alternatively, its inverse, are described by $$y_n = \sum_{m=0}^{M-1} h_m x_{n-m},\ x_n = \sum_{m=0}^{M'-1} g_m y_{n-m}, \tag{24}$$

where $g_n$ is the separating transformation, itself a matrix of filters of length M' (usually M'>M). In component notation $$y_{i,n} = \sum_j h_{ij,n} * x_{j,n}.$$

In one embodiment, the goal is to construct a model sensor distribution parametrized by $g_n$ (or $h_n$), then optimize those parameters to minimize its KL distance to the observed sensor distribution. The resulting optimal separating transformation $g_n$, when applied to the sensor signals, produces the recovered sources $$\hat{u}_{i,n} = \sum_j g_{ij,n} * v_{j,n},$$

In the frequency domain equation (24) becomes $$Y_k=H_kX_k,\ X_k=G_kY_k, \tag{25}$$

obtained by applying the discrete Fourier transform (DFT). A model sensor distribution $pY(\{Y_k\})$ is constructed with a model source distribution $p_x(\{X_k\})$. A factorial frequency-domain model $$P_x(\{X\}) = \prod_{i=1}^{L}\prod_{k=1}^{N/2-1} P_{i,k}(X_{i,k}), \tag{26}$$

is used, where $P_{i,k}$ is the joint distribution of $ReX_{i,k}$, $ImX_{i,k}$ which, unlike equation (9) in the linear case, is not Gaussian.

Using equations (25) and (26), the model sensor distribution $py(\{Y_k\})$ is obtained by $$p_y = \prod_k det(G_k G_k^\dagger) p_x.$$

The corresponding KL distance function is then $$D(p_V,p_Y)=-H_v-\langle \log p_Y\rangle_V,$$

yielding $$D(pv, py) = -\frac{1}{N}\sum_{k=1}^{N/2-1}\left(\log det\ G_k G_k^\dagger + \sum_{i=1}^{L} \log P_{i,k}\right), \tag{27}$$

after dropping the average sign and terms independent of $G_k$.

In the most general case, the model source distribution $P_{i,k}$ may have a different functional form for different sources i and frequencies $\omega_k$. In one embodiment, the frequency dependence is omitted and the same parametrized functional form is used for all sources. This is consistent with a large variety of natural sounds being characterized by the same parametric functional form of their frequency-domain distribution. Additionally, in one embodiment, $P_{i,k}(X_{i,k})$ is restricted to depend only on the squared amplitude $|X_{i,k}|^2$. Hence $$P_{i,k}(X_{i,k})=P(|X_{i,k}|^2;\ \xi_i), \tag{28}$$

where $\xi_i$ is a vector of parameters for source i. For example, P may be a mixture of Gaussian distributions whose means, variances and weights are contained in $\xi_i$.

The factorial form of the model source distribution (26) and its simplification (28) do not imply that the separation will fail when the actual source distribution is not factorial or has a different functional form; rather, they determine implicitly which statistical properties of the data are exploited to perform the separation. This is analogous to the linear case, above, where the use of factorial Gaussian source distribution, equation (9), determines that second-order statistics, namely the sensor cross-spectra, are used. Learning rules for the most general $P_{i,k}$ are derived in a similar fashion.

The $\omega_k$-independence of $P_{i,k}$ implies white model sources, in accord with the separation being defined up to the source power spectra. Consequently, the separating transformation may whiten the recovered sources. Learning rules that avoid whitening will now be derived.

Starting with the factorial frequency-domain model, equation (26), for the source distribution $p_x(\{X_k\})$ and the corresponding KL distance, equation (27), the factor distributions $P_{i,k}$ given in a parameterized form by equation (28) are modified to include the source spectra $S_k$:

$$P_{i,k}(X_{i,k}) = \frac{1}{S_{ii,k}} P\left(\frac{|X_{i,k}|^2}{S_{ii,k}};\ \xi_i\right) \tag{29}$$

This $S_{ii,k}$-scaling is obtained by recognizing that $S_{ii,k}$ is related to the variance of $X_{i,k}$ by $\langle|X_{i,k}|^2\rangle=S_{ii,k}$; e.g., for Gaussian sources $P_{i,k}=(1/\pi S_{ii,k})e^{-|X_{i,k}|^2/S_{ii,k}}$ (see equation (9).

The derivation of the learning rules from a stochastic gradient-descent minimization of D follows the standard calculation outlined above. Defining the log-spectra $q_{i,k}=\log S_{ii,k}$ and using $H_k=G_k^{-1}$, gives:

$$\delta H_k = -\epsilon G_k^{\dagger}\left[I - S_k^{-1}\Phi X_k X_k^{\dagger}\right],\ \delta h_m = \frac{1}{N}\sum_{k=1}^{N-1} e^{iw_k m}\delta h_k, \tag{30}$$

$$\delta q_{i,k} = -\epsilon\frac{1}{N}\left[I - S_k^{-1}\Phi(X_k)X_k^{\dagger}\right]_{ii},$$

$$\delta\xi_i = \epsilon\frac{1}{N}\sum_{k=1}^{N/2-1}\frac{\partial}{\partial\xi_i}\log P\left(\frac{|X_{i,k}|^2}{S_{ii,k}};\xi_i\right),$$

where the vector $\Phi(X_k)$ is given by $$\Phi(X_{i,k}, S_{i,k};\xi_i) = -X_{i,k}\frac{\partial}{\partial a}\log P\left(a = \frac{|X_{i,k}|^2}{S_{ii,k}};\xi_i\right. \tag{31}$$

Note that for Gaussian model sources $\Phi(X_{i,k})=X_{i,k}$, the linear DCA rules, equations (22a) and (22b), are recovered.

The learning rule for the separating filters $g_m$ can similarly be derived:

$$\delta G = \epsilon\left[I - S_k^{-1}\Phi(X_k)X_k^{\dagger}\right]G_k,\ \delta g_m = \frac{1}{N}\sum_{k=0}^{N-1} e^{iw_k m}\delta G_k, \tag{32}$$

with the rules for $q_{i,k}$, ξi in equation (30) unchanged.

It is now straightforward to derive the frequency-domain non-linear DCA learning rules for the separating filters $g_m$ and the source distribution parameters $\xi_i$, using a stochastic gradient-descent minimization of the KL distance, equation (27).

$$\delta G_k = \epsilon(G_k^{-1})^{\dagger} - \epsilon\Phi(X_k)Y_k^{\dagger},\ \delta g_m = \frac{1}{N}\sum_{k=0}^{N-1} e^{iw_k m}\delta G_k, \tag{33}$$

$$\delta\xi_i = \epsilon\frac{1}{N}\sum_{k=1}^{N/2-1}\frac{\partial}{\partial\xi_i}\log P(|X_{i,k}|^2;\xi_i),$$

The vector $\Phi(X_k)$ above is defined in terms of the source distribution $P(|X_{i,k}|^2;\xi_i)$; its i-th element is given by $$\Phi(X_{i,k};\xi_i) = -X_{i,k}\frac{\partial}{\partial a}\log P(a = |X_{i,k}|^2;\xi_i). \tag{34}$$

Note that $\Phi(X_k)Y_k^{\dagger}$ in equation (33) is a complex L×L matrix with elements $\Phi(X_{i,k})Y^{*}_{j,k}$. Note also that only $\delta G_k$, k=1, . . . , N/2−1 are computed in equation (33); $\delta G_0=\delta G_{N/2}=0$ (see equation (26)) and for k>N/2, $\delta G_k=\delta G^{*}_{N-k}$. The learning rate is set by ε.

In one embodiment, to obtain equation (33), the usual gradient, $\delta g_m=-\epsilon\partial D/\partial g_m$ is used, as are the relations $$\frac{\partial\log\det G_k G_k^{\dagger}}{\partial g_{ij,n}} = 2Re\left[e^{i\omega_k n}(G_k^{-1})^{\dagger}_{ij}\right], \tag{35}$$

$$\frac{\partial|X_{l,k}|^2}{\partial g_{ij,n}} = 2Re\left(e^{i\omega_k n}\delta_{i,l}X_{l,k}Y_{j,k}^{\dagger}\right).$$

Equation (33) also has a time-domain version, obtained using DFT to express $X_k$, $G_k$ in terms of $x_m$, $g_m$ and defining the inverse DFT of $\Phi(X_k)$ to be $$\phi_n(X) = \sum_k e^{i\omega kn}\Phi(X_k)/N: \tag{36}$$

$$\delta g_m = \epsilon\tilde{g}_m - \epsilon\sum_{n=m}^{N-1}\phi_n(X)y_{n-m}^T,$$

where $\tilde{g}_m$ is the impulse response of the filter whose frequency response is $(G_k^{-1})^{\dagger}$, or since $G_k^{-1}=H_k$, the time-reversed form of $h_m^T$.

In one embodiment, the transformation of equation (24) is regarded as a linear network with L units with outputs $x_n$, and that all receive the same L inputs $y_n$, then equation (36) indicates that the change in the weight $g_{ij,m}$ connecting input $y_{j,n}$ and output $x_{i,n}$ is determined by the cross-correlation of that input with a function of that output. A similar observation can be made in the frequency domain. However, both rules, equations (33) and (36), are not local since the change in $g_{ij,m}$ is determined by all other weights.

It is possible to avoid matrix inversion for each frequency at each iteration as required by the rules, equations (33) and (36). This can be done by extending the natural gradient concept to the convolutive mixing situation.

Let D(g) be a KL distance function that depends on the separating filter matrix elements $g_{ij,n}$ for all i, j=1, . . . , L and n=0, . . . , N. The learning rule $\delta g_{ij,m}=-\epsilon\partial D/\partial g_{ij,m}$ derived from the usual gradient does not increase D in the limit ε→0:

$$D(g+\delta g) = D(g) + \sum_{ijn}\frac{\partial D}{\partial g_{ij,n}}\delta g_{ij,n} \tag{37}$$

$$= D(g) - \epsilon\sum_{ijn}\left(\frac{\partial D}{\partial g_{ij,n}}\right)^2 \le D(g)$$

since the sum over i, j, n is non-negative.

The natural gradient increment $\delta g_m'$ is defined as follows. Consider the DFT of $\delta g_m$ given by $$\delta G_k = \sum_m e^{-i\omega_k m}\delta g_m.$$

The DFT of $\delta g_m'$ is defined by $\delta G_k'=\delta G_k(G_k^{\dagger}G_k)$. Hence $$\delta g_n' = \sum_{ml}\delta g_m g_m^T + g_{l+n}, \tag{38}$$

where the DFT rule $$G_k = G_k = \sum_k e^{-i\omega_k m}g_m$$

and the fact that $$\sum_k e^{i\omega_k n}/N = \delta_{n,0}$$

were used.

When g is incremented by δg' rather than by δg, the resulting change in D is $$D(g+\delta g')-D(g)=\sum_{ijn}\frac{\partial D}{\partial g_{ij,n}}\delta g'_{ij,n} \tag{39}$$

$$=\sum_{ijn}\frac{\partial D}{\partial g_{ij,n}}\sum_{mlrs}\left(-\epsilon\frac{\partial D}{\partial g_{ir,m}}\right)g^{T}_{rs,m+l}g_{sj,l+n}$$

$$=-\epsilon\sum_{ils}\left(\sum_{jn}\frac{\partial D}{\partial g_{ij,n}}g^{T}_{js,l+n}\right)^{2}\leq 0$$

The second line was obtained by substituting equation (38) in the first line. To get the third line the order of summation is changed to represented it as a product of two identical terms. The natural gradient rules therefore do not increase D. Considering the usual gradient rule, equation (33), the natural gradient approach instructs one to multiply $\delta G_k$ by the positive-definite matrix $G_k^{\dagger}G_k$ to get the rule $$\delta G_k=\epsilon\left[I-\Phi(X_k)X_k^{\dagger}\right]G_k,\ \delta g_m=\frac{1}{N}\sum_{k=0}^{N-1}e^{i\omega_k m}\delta G_k. \tag{40}$$

The rule for $\xi_i$ remains unchanged.

The time-domain version of this rule is easily derived using DFT:

$$\delta g_m=\epsilon g_m-\epsilon\sum_{l=0}^{N-1-m}\left[\sum_{n=0}^{N-1-l}\phi_n(X)x^{T}_{n+l}\right]g_{l+m}. \tag{41}$$

Here, the change is a given filter $g_{ij,m}$ is determined by the filter together with the following sum: take the cross-correlation of a function $\phi$ of output i with each output i' (square brackets in equation (41)), compute its own cross-correlation with the filter $g_{i'j,m}$ connecting it to input j, and sum over outputs i'. Thus, in contrast with equation (36), this rule is based on lateral correlations, i.e., correlations between outputs. It is more efficient than equation (36) but is still not local.

Any rule based on output-output correlation can be alternatively based on input-input or output-input correlation by using equation (24). The rules are named according to the form in which their $g_n$-dependence is simplest.

For Gaussian model sources, $P_{i,k}=X_{i,k}$ is linear and the rules derived here may not achieve separation, unless they are supplemented by learning rules for the source spectra as described above.

Optimization in the Time Domain

Equation (24) can be expanded to the form $$\begin{bmatrix}x_0\\x_1\\x_2\\\vdots\\x_{N-1}\end{bmatrix}=\begin{bmatrix}g_0&0&0&\cdots&0\\g_1&g_0&0&\cdots&0\\g_2&g_1&g_0&\cdots&0\\\vdots&&&&\\g_{N-1}&g_{N-2}&g_{N-3}&\cdots&g_0\end{bmatrix}\begin{bmatrix}y_0\\y_1\\y_2\\\vdots\\y_{N-1}\end{bmatrix} \tag{42}$$

Recall that $x_m$, $y_m$ are L-dimensional vectors and $g_m$ are L×L matrices with $g_m=0$ for $m\leqq M'$, the separating filter length; 0 is a L×L matrix of zeros.

The LN-dimensional source vector on the l.h.s. of equation (42) is denoted by $\bar{x}$, whose elements are specified using the double index (mi) and given by $\bar{x}_{(mi)}=x_{i,m}$. The LN-dimensional sensor vector $\bar{y}$ is defined in a similar fashion. The above LN×LN separating matrix is denoted by $\bar{g}$; its elements are given in terms of $g_m$ by $\bar{g}_{(im),(jn)}=g_{ij,m-n}$ for $n\leqq m$ and $\bar{g}_{(im),(in)}=0$ for n>m. Thus:

$$\bar{x}=\bar{g}\bar{y};\ \bar{x}_{(mi)}=\sum_{n=0}^{N-1}\sum_{j=1}^{L}\bar{g}_{(mi),(nj)}\bar{y}_{(nj)}. \tag{43}$$

The advantage of equation (43) is that the model sensor distribution $p_y(\{y_m\})$ can now be easily obtained from the model source distribution $p_x(\{x_m\})$, since the two are related by det $\bar{g}$, which can be shown to depend only on the matrix $g_0$ lying on the diagonal: det $\bar{g}$=(det $g_0$)N. Thus $p_y$=(det $g_0)^N p_x$.

As in the frequency domain case, equation (26), it is convenient to use a factorial form for the time-domain model source distribution $$p_x(\{x_m\})=\prod_{i=1}^{L}\prod_{m=0}^{N-1}p_{i,m}(x_{i,m}). \tag{44}$$

This form leads to the following KL distance function:

$$D(p_v,p_y)=-\log det\,g_0-\frac{1}{N}\sum_{m=0}^{N-1}\sum_{i=1}^{L}\log p_{i,m}, \tag{45}$$

Again, in one embodiment, a few simplifications in the model, equation (44), are appropriate. Assuming stationary sources, the distribution $p_{im}$ is independent of the particular time point $t_m$. Also, the same functional form is used for all sources, parameterized by the vector $\xi_i$. Hence $$p_{i,k}(x_{i,m})=p(x_{i,m};\xi_i). \tag{46}$$

Note that the $t_m$-independence of $p_{i,m}$ combined with the factorial form, equation (44), imply white model sources as in the frequency-domain case.

In one embodiment, to derive the learning rules for $g_m$ and $\xi_i$, the appropriate gradients of the KL distance, equation (45), are calculated, resulting in $$\delta g_m=\epsilon(g_0^T)^{-1}\delta_{m,0}-\epsilon\frac{1}{N}\sum_{n=m}^{N-1}\psi(x_n)y^{T}_{n-m}, \tag{47}$$

$$\delta\xi_i=\epsilon\frac{1}{N}\sum_{m=0}^{N-1}\frac{\partial}{\partial\xi_i}\log p(x_{i,m};\xi_i).$$

The vector $\psi(x_m)$ above is defined in terms of the source distribution $p(x_{i,m};\xi_i)$; its i-th element is given by $$\psi(x_{i,m};\xi_i)=-\frac{\partial}{\partial x_{i,m}}\log p(x_{i,m};\xi_i). \tag{48}$$

Note that $\psi(x_n)y_{n-m}^{T}$ is a L×L matrix whose elements are the output-input cross-correlations $\psi(x_{i,n})y_{j'm-n}$.

This rule is Hebb-like in that the change in a given filter is determined by the activity of only its own input and output. For instantaneous mixing (m=M=0) it reduces to the ICA rule.

In one embodiment, an efficient way to compute the increments of $g_m$ in equation (47) is to use the frequency-domain version of this rule. To do this the DFT of $\psi(x_m)$ is (defined by $$\Psi_k(x) = \sum_{m=0}^{N-1} e^{-i\omega_k m}\psi(x_m),$$

which is different from $\Phi(X)_k$ in equation (34), and recall that the DFT of the Kronecker delta $\delta_{m,0}$ is 1. Thus:

$$\delta G_k = \epsilon(g_0^T)^{-1} - \epsilon\frac{1}{N}\Psi_k(x)Y_k^\dagger,\ \delta g_m = \frac{1}{N}\sum_{k=0}^{N-1} e^{i\omega_k m}\delta G_k. \tag{49}$$

This simple rule requires only the cross-spectra of the output $\psi(x_{i,m})$ and input $y_{j,m}$ (i.e., the correlation between their frequency components) in order to compute the increment of the filter $g_{ij,m}$.

Yet another time-domain learning rule can be obtained by exploiting the natural gradient idea. As in equation (40) above, multiplying $\delta G_k$ in equation (49) by the positive-definite matrix $G_k^\dagger G_k$, gives $$\delta G_k = \epsilon\left[g(_0^T)^{-1}G_k^\dagger - \frac{1}{N}\Psi_k(x)X_k^\dagger\right]G_k;. \tag{50}$$

In contrast with the rule in equation (49), the present rule determines the increment of the filter $g_{ij,m}$ based on the cross-spectra of $\psi(x_{i,m})$ and of $x_{j,m}$, both of which are output quantities. Being lateral correlation-based, this rule is similar to the rule in equation (40).

Next, by applying inverse DFT to equation (50), a time-domain learning rule is obtained that also has this property:

$$\delta g = \epsilon\sum_{l=0}^{N-1-m}\left[\left(g_l g_0^{-1T} - \frac{1}{N}\sum_{n=0}^{N-1-l}\psi(x_n)x_{n+l}^T\right]g_{m+l}. \tag{51}$$

This rule, which is similar to equation (41), consists of two terms, one of which involves the cross-correlation of the separating filters with the cross-correlation of the outputs $x_n$ and a non-linear function $\phi(x_n)$ thereof (compare with the rule in equation (41)), whereas the other involves the cross-correlation of those filters with themselves.

The invention has now been explained with reference with specific embodiments. Other embodiments will be apparent to those of ordinary skill in the art upon reference to the present description. It is therefore not intended that this invention be limited, except as indicated by the appended claims.

What is claimed is:

1. A signal processing system for separating signals from an instantaneous mixture of signals generated by first and second generating sources, the system comprising:

a first detector, wherein said first detector detects first signals generated by the first source and second signals generated by the second source;

a second detector, wherein said second detector detects said first and second signals; and a signal processor coupled to said first and second detectors for processing the first and second signals detected by each of said first and second detectors (detected signals) wherein the signal processor derives a separating filter using a parameterized model of first and second signals for separating said first and second signals, wherein said processor derives said filter by processing said detected signals in a plurality of time blocks, each time block representing an interval of time wherein said separating filter is constructed by said processor by minimizing a distance function defining a difference between a plurality of said detected signals over the plurality of time blocks and a plurality of the model signals over the time blocks.

2. The system of claim 1, wherein applying said separation filter to said detected signals reproduces one of said first and second signals.

3. The system of claim 1, wherein said processor processes said detected signals in the time domain.

4. The system of claim 1, wherein said processor processes said detected signals in the frequency domain.

5. A signal processing system for separating signals from a convolutive mixture of signals generated by first and second signal generating sources, the system comprising:

a first detector, wherein said first detector detects a first mixture of signals, said first mixture including first signals generated by the first source, second signals generated by the second source and a first time-delayed version of each of said first and second signals;

a second detector, wherein said second detector detects a second mixture of signals, said second mixture including said first and second signals and a second time-delayed version of each of said first and second signals; and a signal processor coupled to said first and second detectors for processing said first and second signal mixtures detected by the first and second detectors (detected signals) in a plurality of time blocks to construct a separating filter for separating said first and second signals wherein the separating filter is constructed using a parameterized model of the first and second signals and wherein said separating filter is constructed by said processor by minimizing a distance function defining a difference between a plurality of said detected signals over the plurality of time blocks and a plurality of the sensor signals over the time blocks.

6. The system of claim 5, wherein applying said separation filter to one of said first and second signal mixtures reproduces one of said first and second signals.

7. The system of claim 5, wherein said processor processes said detected signals in the time domain.

8. The system of claim 5, wherein said processor processes said detected signals in the frequency domain.

9. A signal processing system for separating signals from a mixture of signals generated by a plurality L of signal generating sources, the system comprising:

a plurality L' of detectors, wherein each of said detectors detects a mixture of signals including original source signals generated by each of said sources; and a signal processor coupled to each of said detectors for processing said detected mixture of signals in a plurality of time blocks to construct a separating filter for separating said original source signals wherein the separating filter is constructed using a parameterized model of the original source signals and wherein said separating filter is constructed by said processor by minimizing a distance function defining a difference between a plurality of said detected signals over the plurality of time blocks and a plurality of the model signals over the time blocks.

10. The system of claim 9, wherein each detector detects a time-delayed version of each of said original signals, whereby said mixtures are convolutive.

11. The system of claim 9, wherein L' is equal to L.

12. The system of claim 9, wherein applying said filter to said detected mixture of signals reproduces one of said original source signals.

13. The system of claim 12, wherein said one original source signal is reproduced without interference from the other signals in said detected mixture of signals.

14. The system of claim 9, wherein said processor processes said mixtures in the time domain.

15. The system of claim 9, wherein said processor processes said mixtures in the frequency domain.

16. A signal processing system for separating signals from a mixture of signals generated by a plurality L of signal generating sources, the system comprising:

a plurality L' of detectors for detecting signals $\{v_n\}$, wherein said detected signals $\{v_n\}$ are related to original source signals $\{u_n\}$ generated by the plurality of sources by a mixing transformation matrix A such that $v_n=Au_n$, and wherein said detected signals $\{v_n\}$ at all time points comprise an observed sensor signal distribution $p_v[v(t_1), \ldots, v(t_N)]$ over N-point time blocks $\{t_n\}$ with $n=0, \ldots, N-1$; and a signal processor coupled to said plurality of detectors for processing said detected signals $\{v_n\}$ to produce a filter G for reconstructing said original source signals $\{u_n\}$, wherein said processor produces said reconstruction filter G by minimizing a distance function defining a difference between said observed sensor signal distribution $P_v$ and a model sensor signal distribution $p_y[y(t_1), \ldots, y(t_N)]$ [is minimized], said model sensor signal distribution parameterized by a statistical model of original source signals $\{x_n\}$ and a model mixing matrix H such that $y_n=Hx_n$, and wherein said reconstruction filter G is a function of H.

17. The system of claim 16, wherein said processor minimizes said distance function using a gradient descent method.

18. The system of claim 16, wherein applying said filter to said detected signals $\{v_n\}$ reproduces one of said original source signals $\{u_n\}$.

19. The system of claim 16, wherein G is the inverse of H: $G=H^{-1}$.

20. The system of claim 16, wherein L' is equal to L.

21. The system of claim 16, wherein said detected signals $\{v_n\}$ further include a first and a second time-delayed version of each of said first and second signals, said first delayed version being detected by said first detector, and said second delayed version being detected by said second detector, such that A is a convolutive mixing matrix, and such that $v_n=A*u_n$.

22. The system of claim 21, wherein H is a model mixing filter matrix, such that $y_n=H*x_n$.

23. The system of claim 22, wherein H is frequency dependent and complex.

24. The system of claim 16, wherein said processor processes said mixtures in the time domain.

25. The system of claim 16, wherein said processor processes said mixtures in the frequency domain.

26. In a signal processing system, a method of separating signals from an instantaneous mixture of signals generated by first and second signal generating sources, the method comprising the steps of:

detecting, at a first detector, first signals generated by the first source and second signals generated by the second source;

detecting, at a second detector, said first and second signals; and processing, in a plurality of time blocks, all of said signals detected by each of said first and second detectors (detected signals) to construct a separating filter for separating said first and second signals wherein the separating filter is constructed using a parameterized model of the first and second signals and wherein said processing step includes the step of minimizing a distance function defining a difference between a plurality of said detected signals over the plurality of time blocks and a plurality of the model signals over the time blocks.

27. The method of claim 26, further comprising the step of applying said separation filter to said detected signals to reproduce one of said first and second signals.

28. The method of claim 26, wherein said processing step includes the step of processing said detected signals in the time domain.

29. The method of claim 26, wherein said processing step includes the step of processing said detected signals in the frequency domain.

30. In a signal processing system, a method of separating signals from a convolutive mixture of signals generated by first and second signal generating sources, the method comprising the steps of:

detecting a first mixture of signals at a first detector, said first mixture including first signals generated by the first source, second signals generated by the second source and a first time-delayed version of each of said first and second signals;

detecting a second mixture of signals at a second detector, said second mixture including said first and second signals and a second time-delayed version of each of said first and second signals; and processing said first and second mixtures in a plurality of time blocks to construct a separating filter for separating said first and second signals wherein the separating filter is constructed using a parameterized model of the first and second signals and wherein said processing step includes the step of minimizing a distance function defining a difference between a plurality of said detected signals over the plurality of time blocks and a plurality of the model signals over the time blocks.

31. The method of claim 30, further comprising the step of applying said separation filter to one of said first and second mixtures to reproduce one of said first and second signals.

32. The method of claim 30, wherein said processing step includes the step of processing said detected signals in the time domain.

33. The method of claim 30, wherein said processing step includes the step of processing said detected signals in the frequency domain.

34. A method of constructing a separation filter G for separating signals from a mixture of signals generated by a first signal generating source and a second signal generating source, the method comprising the steps of:

detecting signals $\{v_n\}$, said detected signals $\{v_n\}$ including first signals generated by the first source and second signals generated by the second source, said first and second signals each being detected by a first detector and a second detector, wherein said detected signals $\{v_n\}$ are related to original source signals $\{u_n\}$ by a mixing transformation matrix A such that $v_n=Au_n$, wherein said original signals $\{u_n\}$ are generated by the first and second sources, and wherein said detected signals $\{v_n\}$ at all time points comprise an observed sensor signal distribution $p_v[v(t_1), \ldots, v(t_N)]$ over N-point time blocks $\{t_n\}$ with $n=0, \ldots, N-1$;

defining a model sensor signal distribution $p_y[y(t_1), \ldots, y(t_N)]$ over N-point time blocks $\{t_n\}$, said model sensor signal distribution parameterized by a statistical model of original source signals $\{x_n\}$ and a model mixing matrix H such that $y_n=Hx_n$;

minimizing a distance function, said distance function defining a difference between said observed sensor signal distribution $P_r$ and said model sensor signal distribution $P_y$; and constructing the separating filter G, wherein G is a function of H.

35. The method of claim 34, further comprising the step of:

applying the separation filter G to said received signals $\{v_n\}$ to reproduce said original source signals $\{u_n\}$.

36. The method of claim 35, wherein G is constructed such that two-time cross-cumulants of said reproduced source signals approach zero.

37. The system of claim 34, wherein G is the inverse of H: $G=H^{-1}$.

38. The method of claim 34, wherein said step of minimizing said distance function includes using a gradient descent method.

39. The method of claim 34, wherein said detected signals $\{v_n\}$ further include a first and a second time-delayed version of each of said first and second signals, said first delayed version being detected by said first sensor, and said second delayed version being detected by said second sensor, such that A is a convolutive mixing matrix, and such that $v_n=A*u_n$.

40. The system of claim 39, wherein H is a model mixing filter matrix, such that $y_n=H*x_n$.

41. The method of claim 40, wherein model mixing filter matrix H is frequency dependent and complex.

* * * * *